Sept. 9, 1969  T. A. WAKEFIELD ET AL  3,465,890

TOOL STORAGE AND HANDLING MECHANISM

Filed April 19, 1967  6 Sheets-Sheet 1

INVENTORS
Timothy A. Wakefield
Preston R. Foley, Jr.
Wood, Herron & Evans
ATTORNEYS

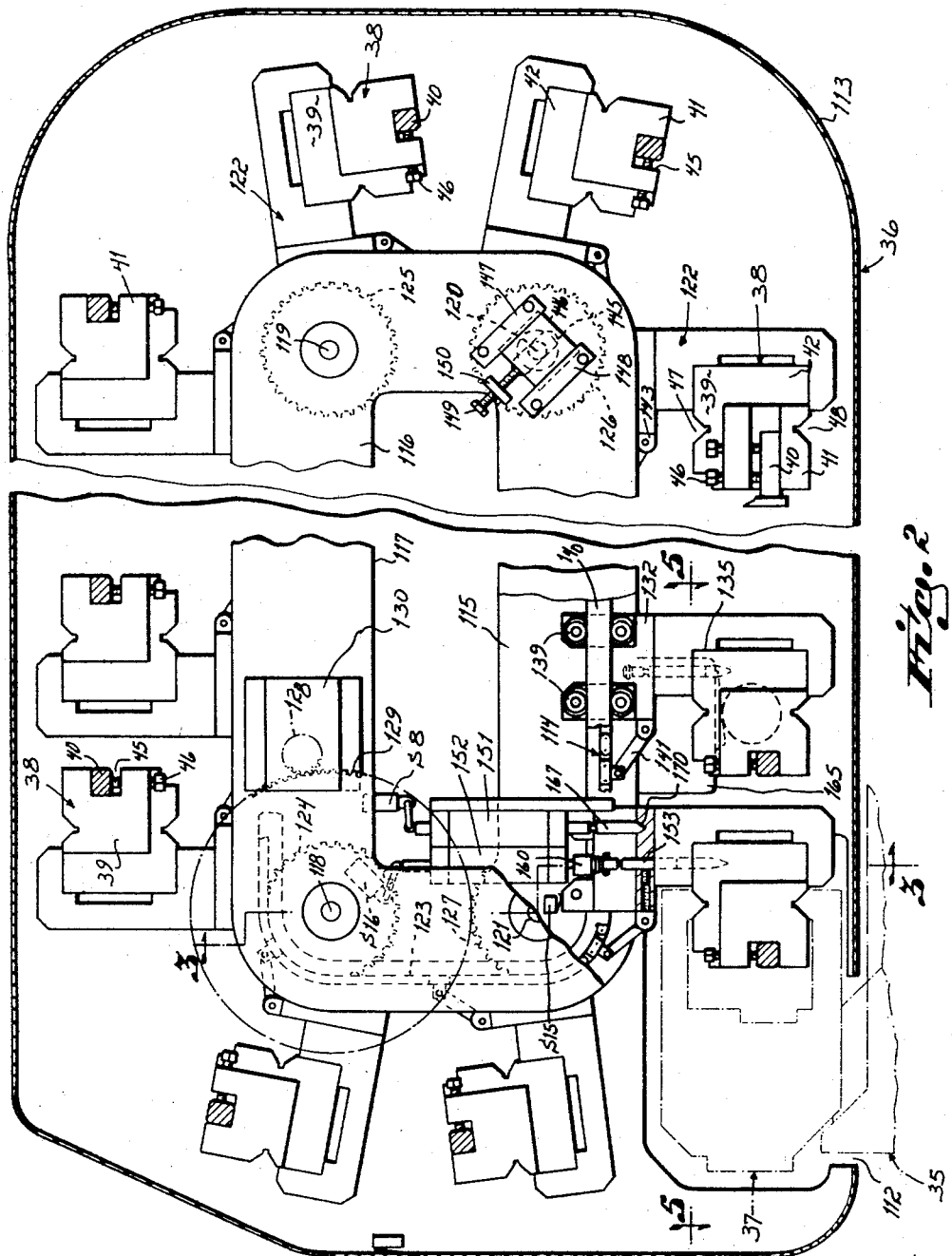

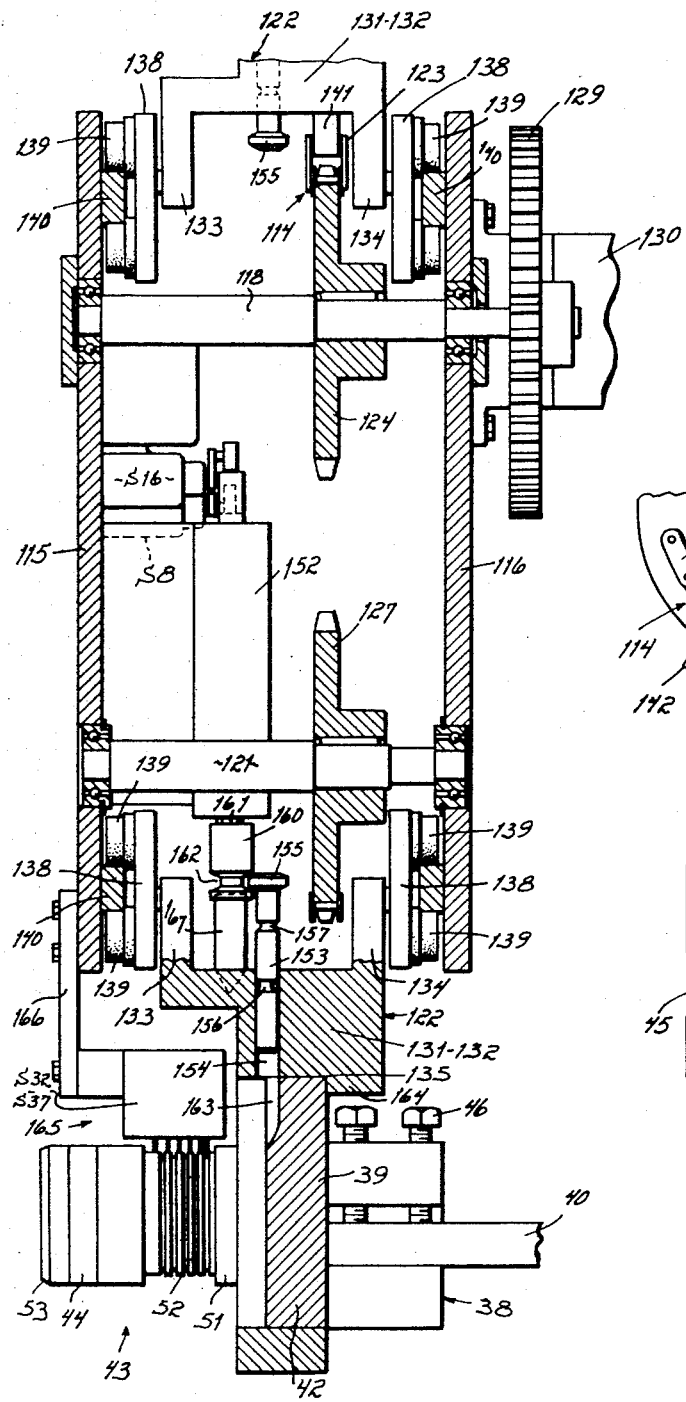
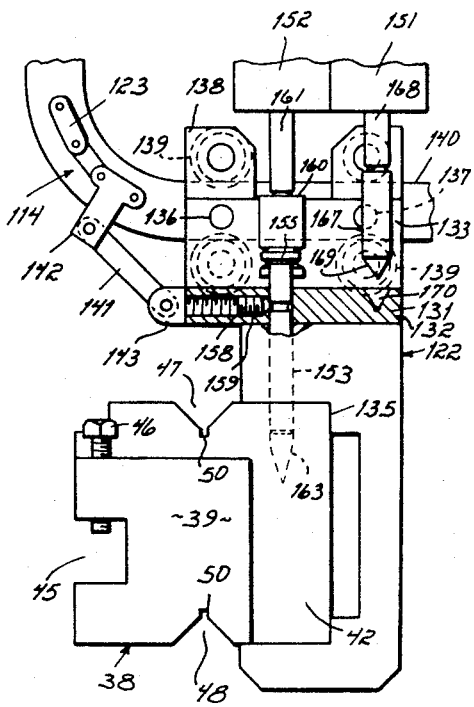

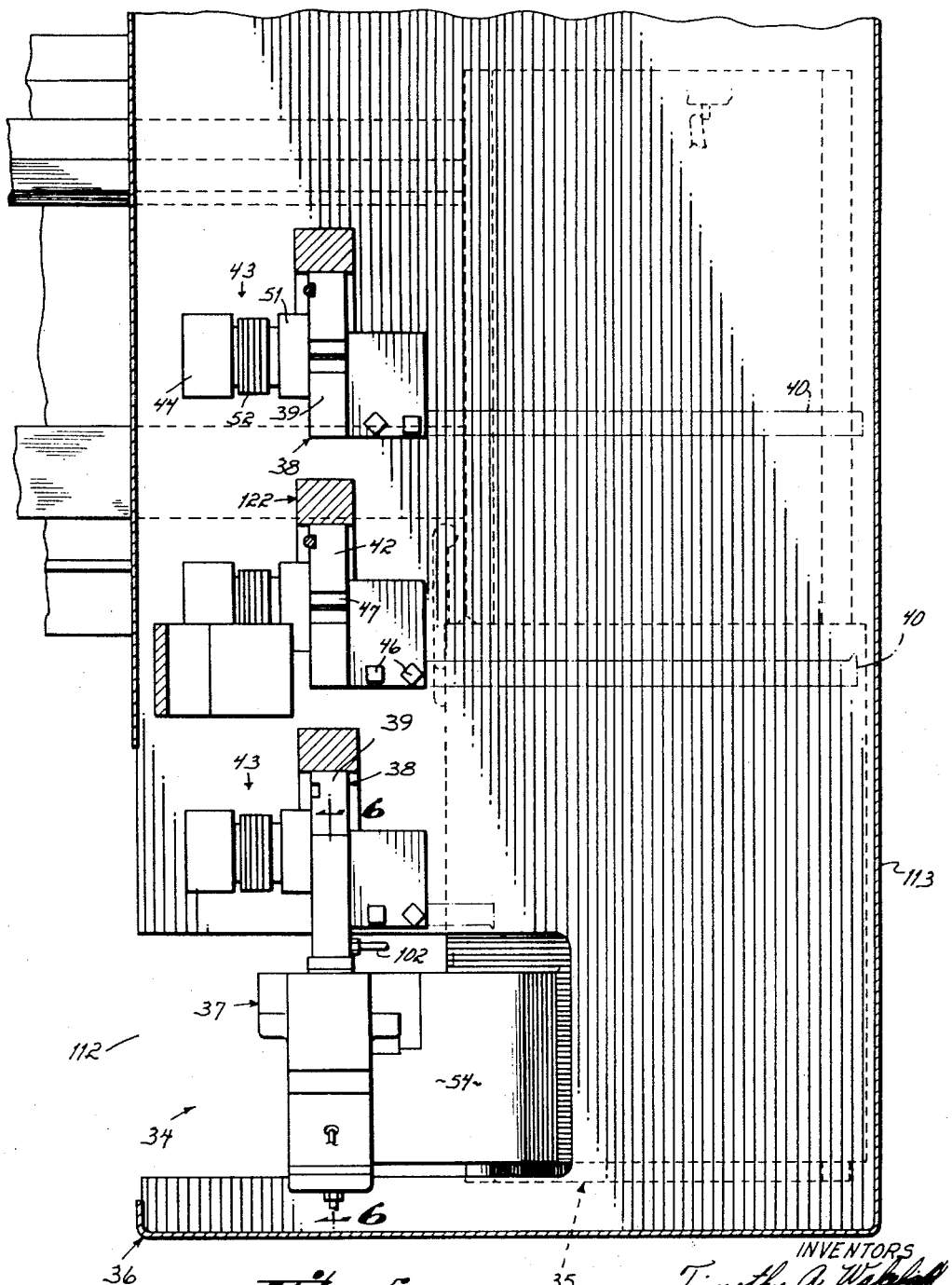

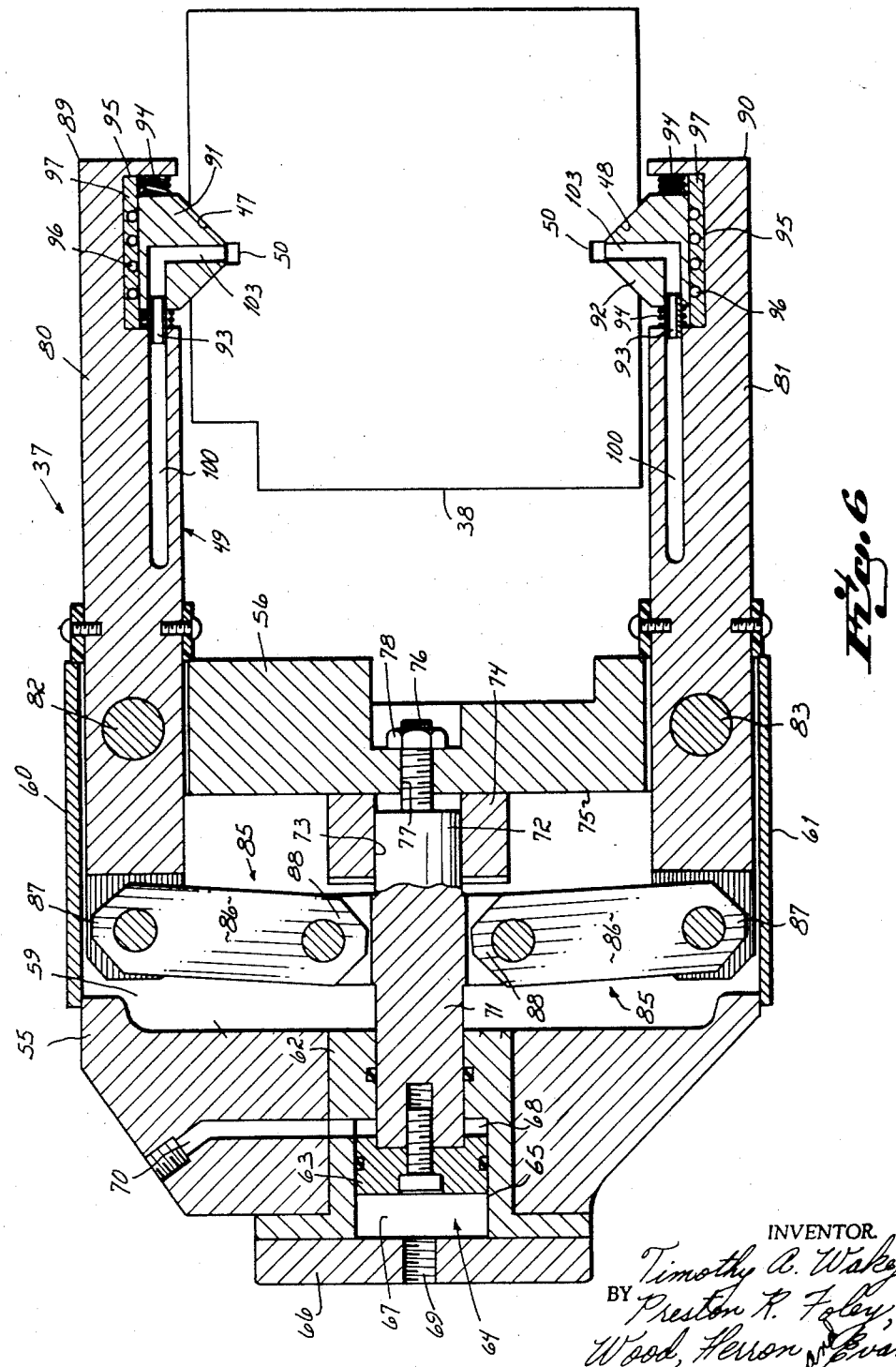

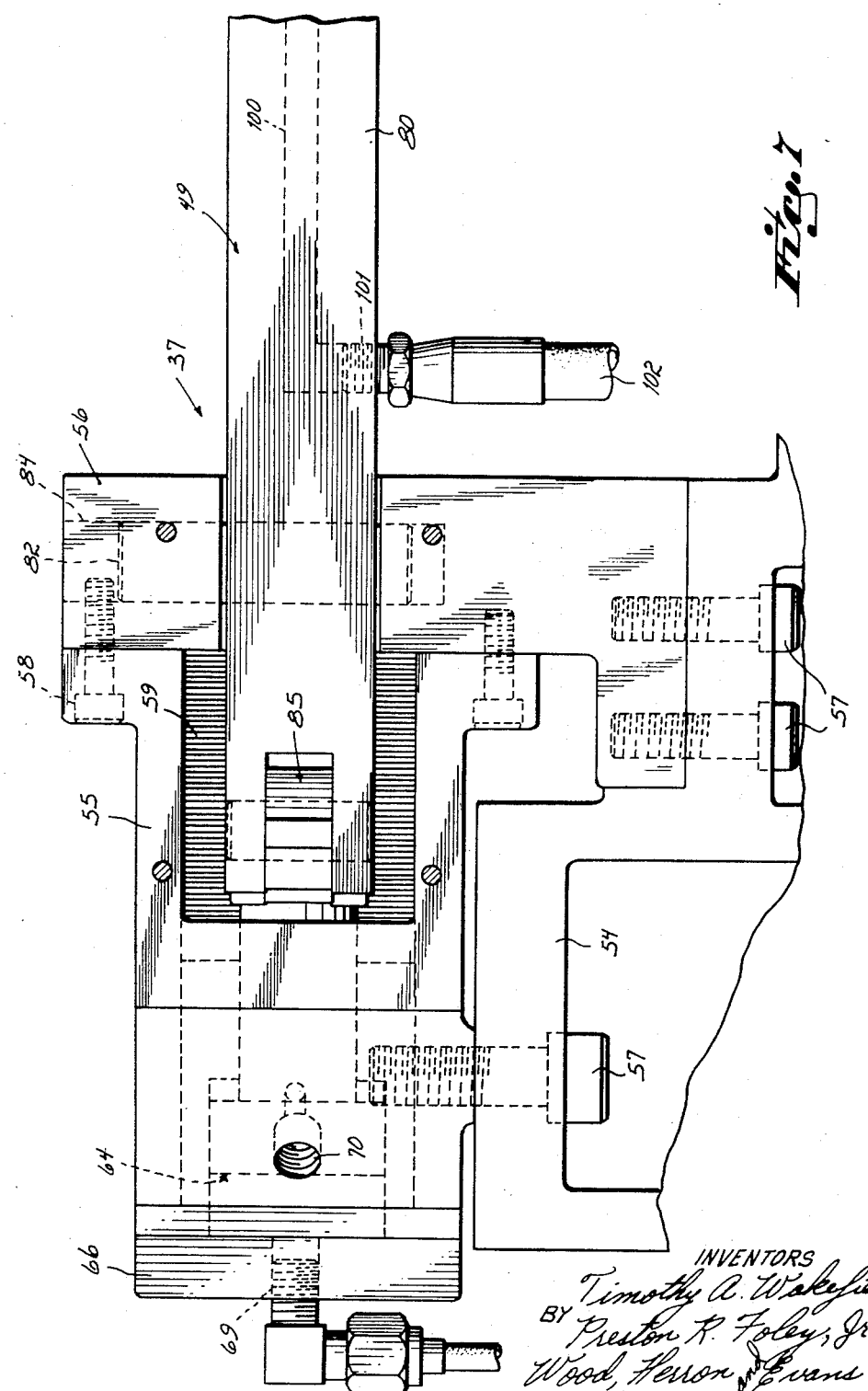

United States Patent Office 3,465,890
Patented Sept. 9, 1969

3,465,890
TOOL STORAGE AND HANDLING MECHANISM
Timothy A. Wakefield and Preston R. Foley, Jr., Cincinnati, Ohio, assignors to R. K. Le Blond Machine Tool Company, a corporation of Ohio
Filed Apr. 19, 1967, Ser. No. 631,931
Int. Cl. A47f *3/08;* B23g
U.S. Cl. 211—1.5         27 Claims

ABSTRACT OF THE DISCLOSURE

A tool storage magazine and mechanism for transporting tools between the magazine and a tool holder of a machine tool. The magazine comprises a series of conveyorized tool storage modules, each module of which supports one tool. The mechanism for inserting and removing tools from the magazine comprises a motor actuated gripper mounted upon a movable slide and having arms engageable with the tools to clamp them therein for movement to and from the tool holder of a machine tool.

CROSS-REFERENCE TO RELATED APPLICATIONS

The tool storage and handling mechanism of this invention is completely described as a portion of an automatic tool changer for a lathe in an application which is being filed concurrently herewith and which is assigned to the assignee of this application. That application contains a complete disclosure of this invention in one preferred environment although it should be understood that the invention is equally applicable to other machine tools and other types of tool changers.

BACKGROUND OF THE INVENTION

The tool storage magazine of this invention is preferably mounted directly upon and supported from the bed of a machine tool. It is so positioned in relation to the tool handling and transfer mechanism and the turret or tool holder of the machine that tools need never be reoriented during transfer between the magazine and the tool holders. This physical orientation or relationship between the tool turret, the transfer slide, and the magazine necessitates that the tools be inserted forwardly into the tool turret and rearwardly into the magazine. Therefore, tools are gripped intermediate their ends during transfer between the magazine and the tool turret, and the tool transfer mechanism is located to one side of the tool during transfer so as to avoid interference between the tool and the turret or the tool and the magazine.

Physical support of the tools during transfer is provided by a tool gripper which has a pair of transversely extending arms engageable with a flange of the tools to clamp the tools between the arms. Since the transfer slide moves at relatively high speeds and develops relatively high acceleration and deceleration forces, the gripper must hold the tools securely during transfer. For this reason, the gripper arms are actuated by a hydraulic motor which is connected to the clamping arms through a toggle linkage. This connection between the motor and the arms has a very high mechanical advantage so that the clamping mechanism is operable to develop very high clamping forces, as for example, one thousand pounds of clamping pressure.

One of the problems encountered in an automatic tool changing mechanism is that of positioning the tool relative to the tool receiving aperture of the tool holder preparatory to tool insertion. In most commercial applications today, the problem is solved by seating a tapered shank tool in a tapered aperture. While this arrangement solves the problem of getting the tool shank into the tool socket, it creates a problem in fixing the axial position of the tool. Many machine tools require a much more precise axial positioning of the tools than is practical with a tapered shank. In these high precision applications, the axial position of the tool must be fixed from a radial surface of the tool.

In order to use a radial surface of the tool to locate the tool in the tool holder, the tool shank must be straight or untapered. If it is straight, however, it must be accurately positioned by the transfer slide for insertion into the tool holder. To reduce the accuracy with which the straight shank of the tool must be positioned relative to the tool holder for insertion into the tool receiving socket, the arms of the tool gripper are provided with movably mounted fingers which accommodate some slight centering movement of the tool relative to the tool socket. A slight chamfer on the tool together with the resiliency of the fingers enables the tool to be self-centering as it enters the tool socket.

To transfer tools from the magazine to the gripper, the preselected tool is first moved to a tool interchange station of the magazine. This movement of the tools to the interchange station is accomplished by a movable conveyor located within the magazine and comprising a plurality of modules, in each one of which a removable tool may be stored.

One of the difficulties of storing tools in modules of a movable conveyor is to provide access between the modules for the tool gripper or transfer mechanism without unduly wasting space in the magazine. To maximize the number of tools which may be stored in the magazine and minimize the space required between the modules for passage of the gripper arms, the magazine conveyor follows a rectangle path of travel and the interchange station is located at one corner of the rectangle. The corner radius of the rectangle is sufficiently small so that the modules travel around the corner quickly or while traveling a relative short linear distance on the conveyor. Thus, a minimum of clearance space is required between the modules in order to provide space for the gripper to enter the tool interchange station.

Since only one of the four corners of the rectangular conveyor is used to accommodate the interchange station, the magazine could be unsymmetrical and still have one sharp or right angle corner for a tool interchange station. However, a symmetrical or rectangular configuration is preferred in order to balance the module weights of the magazine conveyor during translation of tools within the magazine.

One additional advantage of the rectangular magazine configuration is the ease with which it may be expanded to accommodate a greater number of tools without changing the orientation or the relationship between the magazine and the remainder of the machine. Expansion of the magazine capacity is accomplished by simply extending the length of the magazine conveyor and adding modules to it.

To enable the modules to move around the short radius corners of the magazine, each module is supported upon the conveyor by a novel mounting which includes a pair of transport carriers. One of each pair of carriers is located at the front of the module and is pivotally connected to it and the other carrier is pivotally connected to the rear of the module. A pivoted link between the conveyor drive chain and the front carrier pulls the carrier and connected module around the rectangular path of travel of the conveyor.

The tools are locked in the modules in order that they may be transported on the magazine conveyor without any consequent movement of the tools in the modules. This locking of the tools in the modules is accomplished by a module locking pin which may be disengaged from the tool for removal from the module. A single motor is operable to lock or unlock tools in the modules when the modules are located at the interchange station of the magazine.

Other advantages of the invention of this application will be appreciated from the following description of the drawings in which:

FIGURE 2 is a cross-sectional view of the magazine taken along line 2—2 of FIGURE 1.

FIGURE 3 is a cross-sectional view through a portion of the magazine and magazine conveyor taken along line 3—3 of FIGURE 2.

FIGURE 4 is an enlarged elevational view of a portion of the magazine conveyor of FIGURE 2.

FIGURE 5 is a cross-sectional view through the magazine taken along line 5—5 of FIGURE 2.

FIGURE 6 is a cross-sectional view through the tool gripper taken on line 6—6 of FIGURE 5.

FIGURE 7 is a top plan view of the tool gripper.

Figure 1:
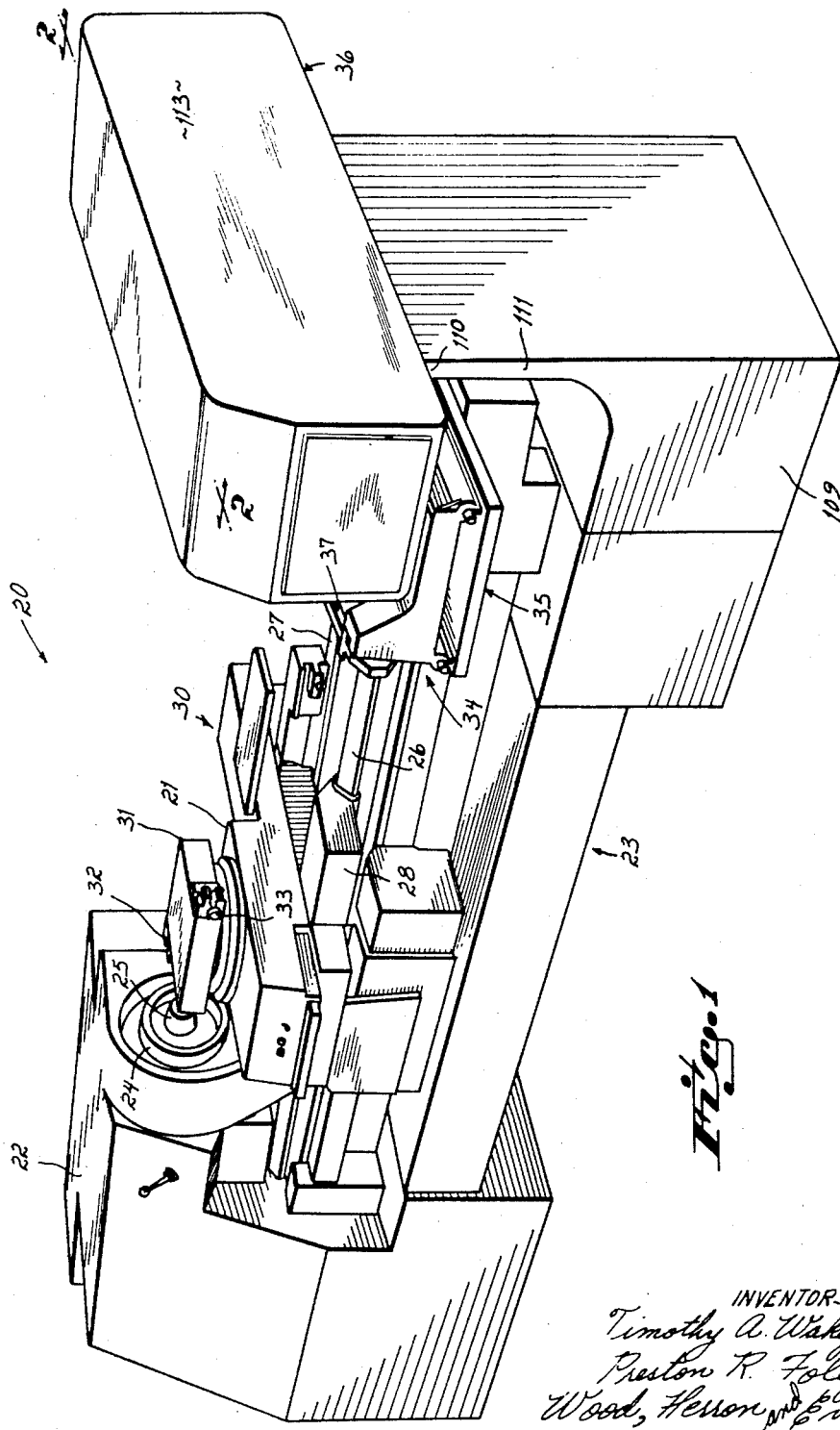
FIGURE 1 is a perspective view of a lathe incorporating the inventive tool storage magazine and tool transfer mechanism of this invention.

Referring to FIGURE 1, the invention of this application is illustrated as applied to a lathe 20, which comprises a tool carriage 21 and headstock 22 mounted upon a bed 23. The headstock 22 is a conventional geared transmission type of headstock operable to drive a spindle (not shown) on the end of which is mounted a chuck 24 for rotatably supporting a workpiece 25. Ways 26, 27 on the top of the bed 23, slidably support a Z axis slide 28 of the carriage 21 for movement longitudinally of the bed along the Z axis of the machine. A saddle or X axis cross slide 30 is slidably supported upon ways (not shown) of the Z axis slide 28 for movement laterally on the bed 23 along the X axis of the machine. A turret 31 is mounted upon the carriage 21 and supports a pair of tools 32, 33 which may be alternately moved into engagement with the rotating workpiece to effect either turning or facing of the workpiece.

An automatic tool changer 34 is also mounted upon the lathe 20 and comprises a tool transfer carriage 35 for transporting tools between the turret 31 and a tool storage magazine 36. The invention of this application is limited to a tool gripping mechanism 37 and to the magazine 36 but is not concerned with the overall construction and operation of the tool changer. A complete description of the tool changer 34 may be found in an application which is being filed concurrently herewith and which is assigned to the assignee of this application. Since the overall construction of this tool changer forms no part of the invention of this application, it is not described herein in detail. Similarly, the lathe 20 forms no part of the invention of this application, and therefore is not described in detail.

The tools 38 which are transported on the transfer or gripper mechanism 37 are best shown in FIGURES 2, 3, and 4. Throughout this application, the term "tool" is used generically to designate a tool adaptor 39 having a cutter bit 40 mounted therein. The cutter bits may be in the nature of facing tools, drills, boring tools, turning tools or any other shaped or configurated machining or forming tool.

Each tool adaptor 39 comprises a forwardly extending cutter clamping block 41, a central flange section 42, a code carrying section 43, and an adaptor locating section 44. The cutter clamping block 41 is generally rectangular and has a longitudinal recess 45 on one side adapted to receive the cutter bit 40. To clamp a cutter bit 40 in the recess, a pair of locking screws 46 are threaded through the top of the block into engagement with the top of the cutter 40.

As may be seen most clearly in FIGURES 3 and 4, the top of the flange section 42 of the tool adaptor is provided with a longitudinally extending V-shaped notch 47. Another V-shaped notch 48 extends longitudinally along the bottom of the flange 42 and the bottom of the cutter clamping block 41 of the adaptor. These notches 47, 48 in the flange 42 serve as clamping surfaces for the tool gripper arm 49 of the gripper mechanism 37. The notch in the bottom of the tool block is provided to enable an arm of the gripper 37 to pass through the notch prior to the pick up of a tool 39 by the gripper 37 or immediately after unclamping of the tool 39 by the gripper 37.

A circular cross-section locating ring 51 extends forwardly from the flange 42 of the adaptor to locate and support the adaptor in a sleeve of the turret 31. The coding section 43 of the adaptor extends forwardly from the locating section 51 and is smaller in diameter than the locating section. It is generally cylindrical in shape and is provided with seats for five split rings 52. The presence or absence of rings in each of these five sites serves as binary coding on the tools to enable thirty-one different tools to be distinguished by an appropriate identification and control circuit of the machine.

The locating section 44 of the adaptor extends forwardly from the coding section 43 and is of the same outside diameter as the locating ring 51. This diameter is slightly smaller than the internal diameter of the tool receiving socket of the turret 31 so that these surfaces accurately locate the adaptor in the turret.

TOOL TRANSFER MECHANISM

As may be best seen in FIGURES 1, 5, 6 and 7 the tool gripper or transfer mechanism 37 is attached to a vertically upstanding support bracket 54 of the tool transfer cross-slide 35. This gripper 37 has a hollow body or casing 55 and a face plate 56 secured to the upstanding bracket 54 by machine screws 57. The face plate 56 is bolted to one end of the body 55 by screws 58 such that it encloses one end of a central cavity 59 of the gripper casing 55. Closure of this cavity is completed by top and bottom cover plates 60, 61.

A hydraulic motor is located within the body 55 and comprises a cylinder defining sleeve 62 and a piston 63. The bore 65 of the cylinder of sleeve 62 is enclosed by a cap 66 secured on a flanged end of the sleeve 62 by bolts (not shown). Fluid is supplied to the end chambers 67, 68 of the cylinder through ports 69 and 70. A piston rod 71 is bolted to the piston 63 and extends through the face plate 56 through the bore 65 in the sleeve 62. The free end 72 of the piston rod 71 is slidably supported within a bore 73 of a support block 74 which is attached to the inner face 75 of the face plate 56. To limit movement of the piston rod 71 toward the face plate 56, a stop bolt 76 is adjustably threaded into the face plate 56 so as to be engaged by the piston rod 71. A lock nut 78 is threaded onto the end of the bolt to secure the bolt in an adjusted position.

The gripper 37 also includes a pair of gripper arms 80, 81 which are pivotally supported upon the face plate by pivot pins 82, 83. Both of these pins 82, 83 extend through the arms and are supported at their ends in apertures 84 of the face plate 56.

Movement of the arms 80, 81 is controlled by a toggle linkage 85 which includes links 86 pivotally connected at one end 87 to the arms 80, 81 and at the opposite end 88 to the piston rod 71. Thus, movement of the piston 63 controls movement of the links 86 and of the arms 80, 81. When the piston is moved inwardly, the piston rod 71 carries the links to a vertically extended position so as to cause the inner ends 89 and 90 of the arms 80, 81 to be moved together as illustrated in FIGURE 6. When the piston 63 is moved outwardly, it causes the links 86 to be moved to an angulated condition in which the ends 89, 90 of the arms 80, 81 are moved apart.

When the arms 80, 81 are moved together, clamping fingers 91, 92 on the ends 89, 90 of the arms 80, 81 move into engagement with the recesses 47, 48 of the tool adaptors 39 so as to securely clamp the tool. In the preferred embodiment, the fingers 91, 92 clamp the tool 39 with a pressure of approximately 1,000 pounds so that there is no chance of the tool moving relative to the grippers upon acceleration or deceleration of the gripper during transfer between the magazine and the turret.

Referring now to FIGURE 6, it will be seen that the fingers 91, 92 of the gripper 37 are mounted for sliding movement on the arms 80, 81 so as to accommodate slight movement of the fingers along the X axis of the machine. To this end, each of the fingers is slidably mounted upon a hollow pin 93 which is supported in the arms 80, 81. Springs 94 hold the fingers 91, 92 in place relative to recesses 95 of the arms and prevent the fingers from moving laterally off of the pins 93.

Preferably, roller bearings 96 supported in a rubber retainer 97 are located between the fingers 91, 92 and the arms 80, 81 so as to transfer clamping pressure between the fingers 91, 92 and the arms while still permitting some lateral or transverse movement of the fingers 91, 92 along the X axis of the machine. This trasverse movement of the fingers along the X axis accommodates some lateral movement of the tool when the clamping section 44 of the tool is inserted into the tool receiving socket of the turret 31.

In the preferred embodiment, there is only .0002 of an inch of clearance between the tool holder socket of the turret and the clamping section of the tool shank. To avoid having to always locate the tool gripper relative to the turret with an accuracy of .0002 inch, the forward end of all of the adaptors are beveled or chamfered as indicated at 53 in FIGURE 3. This bevel 53 renders the tools self-centering upon entry into the tool socket of the turret. The lateral movement of the gripper fingers 91, 92 relative to the arms along the X axis accommodate this self-centering of the tools within the tool receiving sockets of the turret so that slight misalignment of the tools relative to the sockets does not result in interference between the tools and the turret.

As may be seen most clearly in FIGURE 6, both of arms 80, 81 are provided with a conduit 100 which is connected at one end to a port 101 and air hose 102 and at the opposite end with a conduit 103 in the gripping fingers 91, 92. The conduits 103 are open at the apex of the generally triangular shaped fingers 91, 92 such that an air stream emitted from the conduits 103 is operative to blow dust and debris out of the recesses 47, 48 of the tools to enable the arms 80, 81 to better grip and hold the tools during transfer between the magazine and turret.

TOOL STORAGE MAGAZINE

As may be seen most clearly in FIGURES 1, 2, 3 and 4, the tool storage magazine 36 is mounted on the top of a platform 110 which is supported from a vertical extension 111 of the machine pedestal 109. The platform 110 is located above and is spaced from the horizontal plane of the ways 26, 27 so that the tool transfer carriage 35 may be moved beneath the platform 110 and magazine 36 to the tool interchange station of the magazine. As the carriage 35 is moved beneath the magazine, the tool gripper 37 on the top of the carriage 35 passes into the magazine through an opening 112 in the bottom and front of a magazine housing 113.

The tools 38 in the magazine are located in a conveyor 114 which is supported by a pair of transverse support plates 115, 116. For purposes of clarity of the drawings, the remainder of the magazine framework, all of which is supported from the platform 110, has been omitted from the drawings.

As may be seen most clearly in FIGURES 2 and 3, the plates 115 and 116 are mounted in spaced relationship and are of a generally rectangular configuration. To minimize the weight of these plates, the center portion is preferably cut out to provide a central rectangular aperture 117.

At each of the four corners of the plates, four parallel shafts, 118, 119, 120 and 121 extend between the plates and are rotatably journalled therein. These shafts 118, 119, 120 and 121 support and drive sprockets of the chain conveyor 114 which transports a plurality of modules 122 around the rectangular path of travel of the conveyor. This conveyor 114 consists of an endless chain 123 and four sprockets 124, 125, 126 and 127, each one of which is keyed to one of the shafts 118, 119, 120, 121 respectively.

As may be seen most clearly in FIGURES 2 and 3, the shaft 118 extends through the frame plate 116 and has a large spur gear 129 mounted on its outer end. This gear is driven by a smaller spur gear 128 which is mounted on the output shaft of a small rotary hydraulic motor 130. Rotation of the shaft 118 is operative to drive the sprocket 124 and thus the chain 123 and tool support modules 122 mounted thereon.

Each of the modules 122 has a generally C-shaped base section 131. As may be seen most clearly in FIGURES 3 and 4, this base section 131 comprises a transversely extending web portion 132 and a pair of upstanding vertical legs 133, 134 located on opposite sides of the web. A generally C-shaped tool receiving socket 135 extends outwardly and downwardly from the web portion 132 of the base of each module and is adapted to receive and support a tool 39 in the magazine. Each of the legs 133, 134 of the modules carries a pair of outwardly extending shafts 136, 137 having roller support blocks 138 pivotally mounted on their outer ends. Each block 138 rotatably supports two guide rollers 139. These rollers 139 are rotatable over guide rails 140 mounted upon the inside surface of the frame support plates 115, 116 so that the guide rails 140 carry the weight of the modules and tools. The interconnection between each module 122 and the conveyor chain 123 is in the form of a link 141 having one end pivotally attached to a lug 142 of the chain and the opposite end pivotally attached to a protrusion 143 of the module base section 131. As viewed in FIGURE 4, the chain and sprocket drive 114 is operative to effect clockwise rotation of the module about the generally rectangular path defined by the rails 140 such that the links 141 always pull the modules over the guide rails. The pivot connection between the support blocks or carriers 138 and the modules 122 enables the modules to pass around the relatively small radius corners of the magazine conveyor travel path.

To control slack in the chain 123, the shaft 120 is slidably mounted in diagonal slots 145 of the plates 115 and 116. The ends of the shaft 118 are supported in blocks 146 which are slidable within guide rails 147 and 148 bolted to the outside of the frame plates 115 and 116. Abutment screws 149 are threaded through upstanding lugs 150 attached to the plates 115 and 116 such that rotation of the screws 149 effects movement of the blocks 146 within the guide rails 147, 148 and consequently, movement of the sprocket 126 to tighten or loosen the chain 123.

Also mounted within the magazine are two hydraulic motors, one 151 for locking and accurately locating the modules at the tool interchange station, and the other 152 for locking and unlocking the tools in the modules at the interchange station. Locking of the tools 39 in the modules 122 is effected by pins 153 which are slidably mounted within apertures 154 of each of the modules 122. As may be seen in FIGURES 3 and 4, each of these pins 153 has an enlarged head section 155 on its inner end and is provided with two longitudinally spaced annular recesses 156, 157. The recesses are engageable by a spring biased detent 158 (FIGURE 4) which is held in place by a set screw 159 mounted in the web portion 132 of the module base.

The pins 153 reside in the upper position (illustrated in FIGURE 3) out of engagement with the tools 39 when the modules 122 are empty at the interchange station. Whenever a tool is inserted into a module, the pin 153 of that module is lowered into the position illustrated in FIGURE 4 to lock the tool therein. Thereafter, the pin 153 remains in this lowered position throughout the travel of the module 122 on the conveyor until such time as the module is again stopped at the interchange station. The pin 153 is then raised so that the tool is free and may be removed by the gripper.

The mechanism for raising or lowering the pins 153 comprises the hydraulic motor 152 mounted on the inside of the plate 115. An enlarged head 160 on the lower end of a piston rod 161 of the hydraulic motor 152 is provided with a horizontal recess 162 engageable with the headed end 155 of the pins 153. When the head 155 of a pin 153 is vertically aligned with the recess 162 of the head 160 of piston rod 161, the motor 152 may be actuated so as to move the pin 153 downwardly into locked engagement with a tool in the module 122 at the interchange station, or the motor 152 may be raised to disengage the pin 153 from the tool 38 so that the tool may be removed from the module 122.

As may be seen most clearly in FIGURES 3 and 4, the lower ends of the module pins 153 are slidable into milled slots 163 on the forward side of each of the flanges 42 of the tool adaptors 39. When the pins 153 are in the lowered position, engaged with the slots 163, the tools are locked against all movement in the module. Movement in the rearward direction is then limited by engagement of the flange 42 of the tool with a flange 164 of the module and forward as well as lateral movement is then precluded by the pin 153.

Reading of the coding of the tools within the magazine is effected by a readout head 165 attached to the bottom of the plate 115 by a bracket 166. This head 165 is mounted immediately in front of the interchange station in the path of movement of the tools in the magazine as may be seen most clearly in FIGURE 2. Six depending switch actuators of switches S32 through S37 extend downwardly from the head 165 and are engageable with the five coding rings 52 and with the shoulder 51. The actuators of the switches S32, S36 are engageable with the snap rings 52 located in the five coding sites of each adaptor to detect which of thirty-one tools is engaged with the switches. The sixth switch, S37, is a verification switch engageable with the shoulder 51 of the tool adaptor to verify that the tool is properly seated in the module and is not cocked or misaligned relative to the switches.

In operation, the rotary hydraulic motor 130 is operative to drive the conveyor 114 at a high rate of speed until the read out head 165 detects the presence of a preselected tool. Upon detection of the tool at this station, a control circuit is operative to actuate a valve so as to slow the speed of the conveyor to a slow rate of movement until the next tool, which is the preselected tool, is detected at the interchange station by engagement with a switch S15 (FIGURE 2). Actuation of the switch S15 causes the motor 130 and thus the module conveyor 114 to stop with the selected tool at the magazine interchange station. Thereafter, the module locating and locking pin 167 attached to the lower end of a piston rod 168 of the hydraulic motor 151 is moved downwardly until its tapered lower end 169 is located in a tapered recess 170 in the top surface of the web portion 132 of the module 122. Movement of the tapered end 169 of the locating pin into the tapered recess effects accurate positioning of the module at the interchange station as well as locking of the module at the station. When the module locking pin 167 is located within a module recess, a verifier switch S8 located immediately above the top of the hydraulic motor 151 is actuated.

Simultaneously, with the arrival of the preselected tool at the interchange station and the actuation of the hydraulic motor 151 to lower the module locking pin 167, the hydraulic motor 152 is actuated through an appropriate control circuit to lift the tool locking pin 153 of the module 122 at the interchange station out of engagement with the tool contained in that module. A switch S16 located above the motor 152 and engageable by the upper end of the piston rod of the motor, verifies that the pin 153 has been lifted. Thereafter, the gripper and tool slide may be operated so as to engage the selected tool and remove it from the magazine, or if the selected module is empty, to place a tool in the empty module. After a tool is inserted into the module, the motor 152 is actuated to lower the tool locking pin 153 and the motor 151 is actuated to release the module for movement on the conveyor.

The control circuitry, both hydraulic and electrical, which controls the functions and operational sequence outlined hereinabove, has not been illustrated or described herein since it forms no part of the invention of this application. A complete description of this circuitry may be found in the co-pending application for the tool changer method and apparatus which is being filed concurrently herewith and is assigned to the assignee of this application.

While only a single preferred embodiment of the invention of this application has been illustrated and described herein, those skilled in the arts to which this invention pertains will readily appreciate numerous changes and modifications which may be made without departing from the spirit of our invention. Therefore, we do not intend to be limited except by scope of the appended claims.

Having described our invention we claim:

1. For use in combination with a machine tool, a magazine for storing a plurality of replaceable tools, said magazine comprising
   a frame
   a conveyor mounted upon said frame, said conveyor being operative to transport a plurality of modules around an endless path of travel defined by said conveyor, each of said modules being adapted to support a single replaceable tool, said endless path of travel defined by said conveyor including one angulated corner section, and
   a single tool interchange station at which tools are inserted into and removed from said magazine, said interchange station being located at said corner section of said path of travel of said conveyor.

2. The magazine of claim 1 wherein said path of travel defined by said conveyor is rectangular in configuration.

3. The magazine of claim 1 wherein each of said modules includes a tool locking mechanism for locking said tools on said modules for movement on said conveyor.

4. The magazine of claim 1 wherein said magazine includes a motor located at said interchange station and cooperable with the tool locking mechanism of each of said modules when located at said interchange station to lock and unlock tools on said modules.

5. The magazine of claim 1 wherein said conveyor comprises an endless chain, a pair of stationary support rails, and a pair of transport carriers for supporting each of said modules, one of each of said pair of carriers being pivotally connected to the front of one of said modules and the other of each of said pair of carriers being pivotally connected to the rear of one of said modules, said transport carriers being supported from and movable over said stationary support rails, and means interconnecting one of each of said pair of carriers to said endless chain.

6. The magazine of claim 5 wherein said interconnecting means comprises a link pivotally connected at one end to said chain and at the opposite end to said one of said pair of carriers.

7. For use in combination with a machine tool, a magazine for storing a plurality of replaceable tools, said magazine comprising
   a frame,
   a conveyor mounted upon said frame, said conveyor being operative to transport a plurality of modules around an endless path of travel defined by said conveyor, each of said modules being adapted to support a single replaceable tool, each of said modules including a tool locking mechanism carried by said module and engageable with a tool located in said module for locking said tool therein, a stationary tool interchange station located along said path of travel at which tools are inserted into and removed from said magazine, and a motor located at said interchange station and cooperable with said tool locking mechanisms of said modules when located at said interchange station to lock and unlock tools on said modules.

8. The magazine of claim 7 wherein each of said tool locking mechanisms comprises a pin slidably mounted upon each of said modules.

9. The magazine of claim 8 wherein said motor comprises an expansible chamber hydraulic motor having a head on the end of a piston engageable with a slot of each of said locking pins.

10. For use in combination with a machine tool, a tool storage magazine, and a tool transport mechanism for transporting tools between said magazine and a station of said machine tool, said magazine being operable to store a plurality of replaceable tools and comprising a frame, a conveyor mounted upon said frame, said conveyor being operative to transport a plurality of modules around an endless path of travel defined by said conveyor, each of said modules being adapted to support a single replaceable tool, said endless path of travel defined by said conveyor including one angulated corner section, and a single tool interchange station at which tools are inserted into and removed from said magazine, said interchange station being located at the corner section of said path of travel of said conveyor.

11. The tool storage magazine and tool transport mechanism of claim 10, wherein said magazine includes a motor located at said interchange station and cooperable with a tool locking mechanism of each of said modules when located at said interchange station to lock and unlock tools on said modules.

12. The tool storage magazine and tool transport mechanism of claim 11, wherein said conveyor comprises an endless chain, a pair of stationary support rails, and a pair of transport carriers for supporting each of said modules, one of each of said pair of carriers being pivotally connected to the front of one of said modules and the other of each said pair of carriers being pivotally connected to the rear of one of said modules, said transport carriers being supported from and moveable over stationary support rails, and means interconnecting one of said pair of carriers to said endless chain.

13. The tool storage magazine and tool transport mechanism of claim 11, wherein said interconnecting means comprises a link pivotally connected at one end to said chain and at the opposite end to said one of said pair of carriers.

14. The tool storage magazine and tool transport mechanism of claim 10, wherein said tool transport mechanism comprises a supporting slide, a tool gripper mounted upon said slide, said gripper comprising a body, a pair of tool support arms, and a motor for actuating said arms, each of said tool support arms being connected to said body by a pivotal connection, each of said arms having one end extending outwardly from said pivotal connection beyond said body, said motor being operatively connected to said arms so as to move said ends of said arms toward each other into a tool clamping position away and from each other to a tool unclamping position.

15. The tool storage magazine and tool transport mechanism of claim 14, wherein said motor for actuating said arms is operatively connected to said arms by a toggle linkage.

16. The tool storage magazine and tool transport mechanism of claim 14, in which said motor for actuating said arms comprises a piston and cylinder, said motor being operatively connected to said arms by a pair of toggle links, each of said toggle links being pivotally connected at one end by a pivot pin to one of said arms.

17. The tool storage magazine and tool transport mechanism of claim 14, wherein said one end of each of said arms is provided with a conduit through which air is adapted to pass to blow dirt and dust off of said tools prior to clamping engagement by said ends of said arms.

18. The tool storage magazine and tool transport mechanism of claim 16, in which said pivotal connection between said body and each of said arms is located between said one end of said arms and said pivot pin connection between said toggle links and said arms.

19. The tool storage magaizne and tool transport mechanism of claim 10, wherein said transport mechanism comprises a supporting slide, a tool gripper mounted upon said slide, said gripper comprising a body, a pair of tool supporting arms, and a motor for actuating said arms, each of said tool supporting arms being moveably mounted upon said body for movement of one end of each of said arms toward and away from each other, a tool gripping finger slideably mounted upon said one end of said arms, each of said fingers being engageable with a tool when said tool is clamped between said arms, said fingers being longitudinally slideable relative to said arms so as to accommodate longitudinal movement of a tool relative to said arms when said tool is clamped between said arms, and said motor being operatively connected to said arms so as to move said one end of each of said arms toward each other to a tool clamping position and away from each other to a tool unclamping position.

20. The tool storage magazine and tool transport mechanism of claim 19, wherein said motor for actuating said arms is operatively connected to said arms by a toggle linkage.

21. The tool storage magazine and tool transport mechanism of claim 19, in which said motor for actuating said arms comprises a piston and cylinder, said motor being operatively connected to said arms by a pair of toggle links, each of said toggle links being pivotally connected at one end by a pivot pin to one of said arms.

22. The tool storage magazine and tool transport mechanism of claim 19, wherein each of said tool gripping fingers is provided with a conduit through which air is adapted to pass to blow dirt and dust off of said tools prior to clamping engagement of said fingers with said tools.

23. The tool storage magazine and tool transport mechanism of claim 21, in which said mounting connection between body and each of said arms is located between said one end of said arms and said pivot pin connection between said toggle links and said arms.

24. For use in combination with a machine tool, a magazine for storing a plurality of replaceable tools, said magazine comprising a frame, a conveyor mounted upon said frame, said conveyor being operative to transport a plurality of modules around an endless path of travel defined by said conveyor, said endless path of travel being located in a vertical plane, each of said modules being adapted to support a single replaceable tool, said endless path of travel defined by said conveyor including one angulated corner section, and a tool interchange station at which tools are inserted into and removed from said magazine by movement in a horizontal plane, said interchange station being located at said corner section of said path of travel of said conveyor.

25. The magazine of claim 24, wherein each of said modules includes tool locking mechanism for locking said tools on said modules for movement on said conveyor.

26. The magazine of claim 25, wherein said magazine includes a motor located at said interchange station and cooperable with the tool locking mechanism of each of said modules to lock and unlock tools on said modules.

27. The magazine of claim 24, wherein said conveyor comprises an endless chain, a pair of stationary support rails, and a pair of transport carriers for supporting each of said modules, one of each of said pair of carriers being pivotally connected to the front of one of said modules and the other of each of said pair of carriers being pivotally connected to the rear of one of said modules, said transport carriers being supported from and moveable over said stationary support rails, and means interconnecting one of each of said pair of carriers to said endless chain.

References Cited

UNITED STATES PATENTS

| | | | |
|---|---|---|---|
| 2,935,367 | 5/1960 | Crawford | 312—268 |
| 3,286,344 | 1/1966 | Brainard | 211—1.5 X |

CHANCELLOR E. HARRIS, Primary Examiner

U.S. Cl. X.R.

29—568